United States Patent [19]

Frese, Jr. et al.

[11] Patent Number: 4,609,440

[45] Date of Patent: Sep. 2, 1986

[54] ELECTROCHEMICAL SYNTHESIS OF METHANE

[75] Inventors: Karl W. Frese, Jr., Cupertino; Steven C. Leach, Menlo Park; David P. Summers, San Francisco, all of Calif.

[73] Assignee: Gas Research Institute, Chicago, Ill.

[21] Appl. No.: 811,017

[22] Filed: Dec. 18, 1985

[51] Int. Cl.$^4$ .................................................. C25B 3/00
[52] U.S. Cl. .......................................... 204/76; 204/72
[58] Field of Search ..................................... 204/76, 72

[56] References Cited

U.S. PATENT DOCUMENTS 3,766,027  10/1973  Gregory ................................. 204/72
4,523,981  6/1985  Ang et al. ............................. 204/72

*Primary Examiner*—R. L. Andrews
*Attorney, Agent, or Firm*—Fliesler, Dubb, Meyer & Lovejoy

[57] ABSTRACT

A method is described for electrochemically reducing carbon dioxide to form methane by electrolyzing an aqueous solution containing carbon dioxide utilizing a cathode which comprises ruthenium. If desired, solar energy can be utilized to provide the potential for the electrolyzing. In such an instance, solar energy is, in essence, stored as chemical energy which can later be recovered from the methane.

4 Claims, No Drawings

ELECTROCHEMICAL SYNTHESIS OF METHANE

DESCRIPTION

1. Technical Field

The invention relates to a method for electrochemically reducing carbon dioxide to form methane utilizing a ruthenium cathode.

2. Background

The prior art does not set forth an efficient method for the direct electrochemical synthesis of methane in an aqueous electrochemical process. Indeed, when carbon dioxide has been electrochemically reduced in an aqueous solution the products have usually been carbon monoxide and formaldehyde. Under certain conditions and using certain particular electrodes it has been possible to convert carbon dioxide to methanol by electrolysis of an aqueous carbon dioxide solution. D. Canfield and K. W. Frese, Jr., Electrochem. Soc. 130, 1772 (1983) and K. W. Frese, Jr., and D. Canfield, J. Electrochem. Soc. 131, 2518 (1984).

DISCLOSURE OF INVENTION

In accordance with the present invention, a method is set forth for electrochemically reducing carbon dioxide to form methane. The method comprises electrolyzing an aqueous solution containing carbon dioxide and utilizing a cathode which comprises ruthenium to produce the methane.

Utilizing a ruthenium cathode in accordance with the present invention allows the production of methane by the aqueous electrolysis of a carbon dioxide solution at reasonably high faradaic efficiency. In this manner, electrical energy can be converted into chemical energy, effectively storing the chemical energy in the methane fuel. Methane fuel can later be burned to recapture the energy. The energy for the electrochemical reaction can be provided by solar cells or the like.

BEST MODE FOR CARRYING OUT THE INVENTION

The standard electrode potential for the electrochemical half-cell:

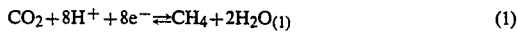

$$CO_2 + 8H^+ + 8e^- \rightleftharpoons CH_4 + 2H_2O_{(l)} \quad (1)$$

is only $+0.17$ V(SHE). Under standard conditions it is therefore expected that reaction (1) should occur at potentials close to that for the hydrogen evolution reaction.

In accordance with the present invention it had been found that when ruthenium is utilized as the cathode and when the pH of the aqueous solution falls within a range from about 1 to about 7 methane is electrochemically produced from carbon dioxide. Generally, the aqueous solution is substantially saturated with, and will be maintained substantially saturated with, carbon dioxide throughout the electrolysis. Preferably, the solution is at a temperature which falls within a range from about 10° C. to about 100° C., more preferably from about 50° C. to about 80° C. Electrolyzing is generally carried out at a potential which falls within a range from about $-0.25$ V to about $-1.0$ V versus SCE and is preferably carried out at a potential which falls in a range from about $-0.3$ V to about $-0.7$ V.

The invention will be better understood by reference to the experimental data which follows:

EXPERIMENTAL

Both electroplated and teflon-supported Ru electrodes (geometrical area, 1–3 cm$^2$) were used for CO$_2$ electrolysis. The former were formed on spectroscopic pure carbon rods using a plating bath consisting of 0.0084M Ru(NO)Cl$_3$ and 0.4M reagent H$_2$SO$_4$. The latter type of electrode was fabricated by pressing a mixture of 4–5 gm of Ru sponge (99.99%, Mattey-Bishop) with 5–12 weight % Halon TFE resin, type 6–80 onto a Cu mesh. The resulting pellets were contacted by a Cu wire and sealed in a glass tube with epoxy resin (Epoxy Patch). A 5 minute dip in concentrated HCl was used to clean the Teflon bonded Ru surfaces. This cleaning procedure is not essential for producing methane.

Electrolytes were prepared from reagent grade Na$_2$SO$_4$ or H$_2$SO$_4$ and purified, distilled H$_2$O (milligard filtered). A Pine RDE-3 potentiostat was used for controlled potential electrolysis in a closed system consisting of a 1.1 l CO$_2$ reservoir, a teflon circulation pump, and an electrolysis cell. The anode and cathode compartments were separated by a Na$_2$SO$_4$/agar bridge. Current-time plots were obtained and manipulated by a laboratory microcomputer.

Product Analysis

Formaldehyde was determined by the chromotropic acid colorimetric method. Plots of absorbance versus concentration were linear from $10^{-4}$ to $10^{-6}$M.

Methanol was detected by flame ionization gas chromatography (FID) using a column of Porapak N. To obtain good separation from H$_2$O and reproducibility in the results, the CH$_3$OH/H$_2$O vapor was analyzed in equilibrium with the CH$_3$OH/Na$_2$SO$_4$ electrolyte. Peak area versus CH$_3$OH concentration in the liquid was linear from $10^{-4}$ to $5\times10^{-2}$M. Methane was also analyzed by FID using Porapak R and Q. Varying amounts up to $10^{-7}$M were found in the CO$_2$ reactant gas. CH$_4$ was detectable at $\leq 10^{-8}$M in a calibration of CH$_4$/N$_2$ mixtures.

Results

The faradaic efficiencies for CH$_4$, CO, and CH$_3$OH are given in Table 1. These results were obtained with the electroplated electrodes in CO$_2$-saturated 0.2M Na$_2$SO$_4$ or 0.1M H$_2$SO$_4$ electrolytes. The average current obtained by dividing the integral charge (Column 5) by the total elapsed time is given in Column 3. The apparent increase in CH$_4$ yield with increasing temperature is not surprising in view of the expected kinetic complications for an 8-electron reduction. The efficiency for CO was always 1 to 5% with the exception of one datum. Rather high yields of CH$_3$OH were also found as shown in the last column of Table 1. A portion of the CO and CH$_3$OH may be due to CO$_2$ reduction by localized cathodic and anodic reactions at the Ru electrode (see below). Reaction [1] in 0.5M H$_2$SO$_4$ at $-0.15$ to $-0.3$ V(SCE) (55°–60° C.) have given faradaic efficiencies of 0.4%. Perhaps too high a coverage with H$_{ad}$ is obtained in such strongly acidic solutions.

It was necessary to show that CH$_4$ could be produced in the absence of the carbon substrate because of the potential reactivity of carbon atoms adsorbed on the Ru surface. For this reason, teflon-supported Ru sponge electrodes were utilized. The results of two trials in 0.1N H$_2$SO$_4$ at 46° C. were faradaic decimal efficiencies of 0.059 and 0.098 for CH$_4$. The electrode potential was −0.37 to −0.39 V(SCE) and the average current was 0.3 to 0.6 mA. Clearly the carbon substrate is not essential to the formation of $CH_4$.

It was also shown that the Ru surface is active in $CO_2$ reduction under open circuit conditions in 0.2M $Na_2SO_4$, pH 4–5. The data in Table 2 reveal that CO and small amounts of $CH_3OH$ are produced by a localized cell reaction. The time of these open circuit experiments was equivalent to the 15–20 coulomb runs in Table 1. Note the similar pH change accompanying the $CO_2$ reduction. Importantly, no $CH_4$, was detected in these trials.

TABLE 1

FARADAIC EFFICIENCIES AS DECIMAL FOR $CH_4$, CO, AND $CH_3OH$ ON ELECTROPLATED RUTHENIUM ELECTRODES IN $CO_2$—SATURATED ELECTRODES

| pH range | T °C. | $<i>$ mA | V(SCE) | Q coul | $F_{CH_4}$ | $F_{CO}$ | $F_{CH_3OH}$ |
|---|---|---|---|---|---|---|---|
| 0.2 M $Na_2SO_4$ | | | | | | | |
| 4.2–6.8 | 46 | 0.300 | −0.65 | 98.5 | 0.046 | 0.025 | 0.029 |
| 4.2–4.8 | 50 | 1.6 | −0.60 | 3.9 | 0.086 | 0.042 | — |
| 4.2–5.5[a] | 55 | 0.243 | −0.56 | 15.4 | 0.045 | 0.048 | 0.094 |
| 3.5–5.5[b] | 60 | 0.387 | −0.54 | 27.2 | 0.11 | 0.012 | 0.42 |
| 4.2–6.8 | 61 | 0.313 | −0.55 | 19.8 | 0.30 | 0.45 | 0.25 |
| 4.2–5.9 | 67 | 0.270 | −0.57 | 19.0 | 0.24 | 0.03 | 0.15 |
| 1.4[c] | 46 | 0.500 | −0.35 | 114.0 | 0.088 | 0.024 | trace |

[a]Also contained 0.1 M $H_3BO_3$ to slow pH increase
[b]0.1 N $H_2SO_4$ added to lower pH range
[c]In 0.1 N $H_2SO_4$

TABLE 2

MOLARITY OF CO AND $CH_3OH$ PRODUCED UNDER OPEN-CIRCUIT CONDITIONS WITH TEFLON-SUPPORTED Ru ELECTRODES IN $CO_2$—SATURATED 0.2 M $Na_2SO_4$[a]

| T °C. | Time hrs. | $pH_{initial}$ | $pH_{final}$ | $[CH_4]_g$ | $[CO]_g$ | $[CH_3OH]_l$ |
|---|---|---|---|---|---|---|
| 21 | 18 | 4.2 | 5.2 | ND | $6.0 \times 10^{-6}$ | ND |
| 21 | 20 | 4.2 | 5.0 | ND | $6.1 \times 10^{-6}$ | $<10^{-4}$ |
| 46 | 16.5 | 4.2 | 5.2 | ND | $1.3 \times 10^{-6}$ | $1 \times 10^{-4}$ |
| 68[b] | 18.6 | 4.2 | 5.6 | ND | $2.3 \times 10^{-6}$ | $5 \times 10^{-4}$ |

[a]Cell vapor space, 1.3 liter; electrolyte volume, 0.025 l
[b]Unknown small concentration of formaldehyde detected
ND = none detected It will be noted that faradaic efficiencies for production of methane reached as a high a value as 30% (Table 1) which is particularly surprising since the prior art provides no electrodes which will produce more than trace quantities of methane by the electrolysis of carbon dioxide in an aqueous solution. It should also be noted that at higher temperatures the production of methane is more favored.

INDUSTRIAL APPLICABILITY

According to the present invention, methane may be formed by the electrochemical reduction of carbon dioxide. The methane formed can later be used as a fuel to produce power.

While the invention has been described with respect to certain specific embodiments thereof it will be understood that many variations are possible within the scope and spirit of the invention as defined by the appended claims.

We claim:

1. A method for electrochemically reducing carbon dioxide to form methane, comprising:
   electrolyzing an aqueous solution containing carbon dioxide utilizing a cathode which comprises ruthenium to produce methane.
2. A method as set forth in claim 1, wherein the pH of the solution falls within a range from about 1 to about 7.
3. A method as set forth in claim 1, wherein the solution is at a temperature which falls within a range from about 20° C. to about 100° C.
4. A method as set forth in claim 1, wherein the electrolyzing is carried out at a potential which falls in a range from about −0.3 V to about −0.7 V versus SCE.

* * * * *